United States Patent [19]
Carpenter et al.

[11] Patent Number: 5,637,344
[45] Date of Patent: Jun. 10, 1997

[54] CHOCOLATE FLAVORED HARD CANDY

[75] Inventors: John R. Carpenter, Hershey; Ann L. Gutshall-Zakis, Harrisburg; Ofomata E. Ejike, Palmyra; R. Mark Heim, Haarrisburg, all of Pa.

[73] Assignee: Hershey Foods Corporation, Hershey, Pa.

[21] Appl. No.: 546,517

[22] Filed: Oct. 20, 1995

[51] Int. Cl.⁶ .............................. A23G 1/00; A23G 3/00
[52] U.S. Cl. ............................................ 426/631; 426/660
[58] Field of Search ................................ 426/660, 631

[56] References Cited

U.S. PATENT DOCUMENTS

| | | | |
|---|---|---|---|
| H1527 | 4/1996 | Moore | 426/660 |
| 3,726,484 | 4/1973 | Schurr | 241/5 |
| 3,840,188 | 10/1974 | Coombe et al. | 241/39 |
| 4,056,233 | 11/1977 | Fay | 241/39 |
| 4,151,308 | 4/1979 | Ziccarelli et al. | 426/613 |
| 4,189,102 | 2/1980 | Andrews | 241/5 |
| 4,206,245 | 6/1980 | Drevici et al. | 426/599 |
| 4,287,216 | 9/1981 | Mangano | 426/103 |
| 4,307,126 | 12/1981 | Sano et al. | 426/660 |
| 4,504,017 | 3/1985 | Andrews | 241/40 |
| 4,517,205 | 5/1985 | Aldrich | 426/660 |
| 4,807,815 | 2/1989 | Csillag et al. | 241/39 |
| 4,902,519 | 2/1990 | Ream | 426/103 |
| 5,171,402 | 12/1992 | Haines et al. | 162/157.3 |
| 5,185,175 | 2/1993 | Loh et al. | 426/631 |
| 5,190,786 | 3/1993 | Anderson et al. | 426/631 |

*Primary Examiner*—Jeanette Hunter
*Attorney, Agent, or Firm*—Scully, Scott, Murphy & Presser

[57] ABSTRACT

The present invention relates to an amorphous crystalline chocolate flavored hard candy confection utilizing air-jet milled cocoa powder in which the particles thereof are less than about 15 microns in size and generally have rounded edges to achieve a desirable smooth texture and to the process of preparing the same.

33 Claims, No Drawings

CHOCOLATE FLAVORED HARD CANDY

FIELD OF THE INVENTION

The present invention is directed to a method of preparing chocolate flavored amorphous hard candy utilizing air-jet milled cocoa powder and the product prepared thereby.

BACKGROUND OF THE INVENTION

Hard candy confections are very popular in the United States. They are amorphous confections having a relatively smooth and glassy surface. They appear in various shapes and sizes and come in various flavors, such as fruit, mint, butterscotch, peppermint, and the like. Although chocolate is a very popular flavor in other types of confections, it is surprising that chocolate flavored hard candy makes up only a small percentage of the hard candy market. An example of a hard candy chocolate product was sold in Japan and named BLACK and WHITE. It was manufactured by Kanro and was sold as part of a pair of products. The BLACK hard candy contained a chocolate flavored hard candy center, and the surface thereof was dusted with cocoa powder, while in the product called "WHITE", the candy contained a hard candy center and the surface was dusted with milk powder. The "BLACK" product had a rough, coarse, sandy surface—characteristics which are not acceptable for hard candy.

Thus, the present inventors sought to make a chocolate flavored hard candy which exhibits mouthfeel, texture and organoleptic characteristics typical of hard candy. First, they used commercial cocoa powder to make the hard candy.

Cocoa powder is the food prepared by pulverizing the material remaining after a portion of the cocoa butter is removed from the chocolate liquor. Commercial cocoa powders are typically produced by grinding cocoa presscake with pinned disc mills or hammer mill type equipment. The resultant cocoa powder meets particle size specifications which are typically 98-100% through a U.S. 200 mesh screen (75 microns).

However, when the inventors prepared a chocolate flavored hard candy from commercial cocoa powder, the resulting product was unacceptable. It had a rough surface and sandpaper-like feel to the tongue. When viewed under a scanning electron microscope, it was found that the particles from most commercial cocoa powder were larger than 15-25 microns, the threshold widely cited in the literature for sensory perception. In addition, the particles had an irregular shape, with uneven, jagged and sharp edges which accounted for its unacceptable textural sensation.

Thus, commercial cocoa powder, as such, could not be used to make acceptable chocolate flavored hard candy. Obviously, the cocoa powder needed to undergo further treatment before it could be used as an ingredient.

The use of wet micromilled cocoa powder was also considered but was found to be unworkable. U.S. Pat. No. 5,185,175 describes a chocolate food product comprised of an aqueous sugar solution of microparticularized cocoa, while U.S. Pat. No. 5,190,786 describes a chocolate chip prepared by utilizing an aqueous sugar paste containing microparticles of cocoa dispersed in the paste. In neither instance was the product produced a hard candy since the micromilled cocoa powder was in water based chocolates, icings, frostings, or other products. Furthermore, the process utilized to pulverize the cocoa powder was not adaptable to the preparation of hard candy since in both instances, the cocoa powder used was wet-milled, i.e., milled in the presence of water. As both patents indicate, cocoa powder can only be wet-milled at water levels above 70%. Cocoa with this much water would be added before the cook. This is undesirable in making chocolate flavored hard candy due to problems with effects on equipment such as sticking and burn-on, swelling of particles and higher viscosities during forming.

The inventors attempted to make chocolate flavored hard candy using micromilled cocoa to prepare the hard candy. When the cocoa particles were milled to a smaller size, the product formed was still unacceptable. For example, when the cocoa powder was further milled on a roll refiner with fat added to produce particles having an average size of 6 microns, the resultant cocoa powder still imparted a rough surface texture to hard candy prepared therefrom. Thus, mere milling of the cocoa powder to a small particle size was not sufficient to solve the textural problems that heretofore have not been overcome.

But, it was found that a key to making acceptable chocolate flavored hard candy was to utilize a cocoa powder which, when micromilled, would produce appropriately small particles having a generally smooth surface. Cocoa powder particles of size less than about 15 microns generally having non-jagged and smooth and rounded surfaces were found to provide an acceptable sensation to the tongue. Thus, when the inventors found a method which produced micromilled cocoa powder particles generally having smooth edges and prepared a hard candy therefrom, the product produced had a smooth textural feel to the tongue as well as the organoleptic, textural and visual appeal of hard candy. This product was therefore an acceptable chocolate flavored hard candy confectionery.

SUMMARY OF THE INVENTION

Accordingly, the present invention is directed to a process for preparing an amorphous chocolate flavored hard candy comprising (a) air-jet milling cocoa powder under conditions sufficient to produce particles having an average size of less than about 15 microns in diameter and having generally rounded edges (b) dissolving an amorphous candy mass comprising a sweetener to produce an aqueous solution of the amorphous candy mass, said sweetener being a carbohydrate, sugar alcohol or mixture thereof, and heating the solution under conditions sufficient to convert and maintain the sweetener in the amorphous state, (c) mixing a chocolate flavoring effective amount of the air-jet milled cocoa powder with a sweetening effective amount of the aqueous solution of said amorphous candy mass at sufficiently high temperatures to effect the dispersion of said cocoa powder therein, (d) forming the product of (c) and (e) cooling the product of (d). The present invention is also directed to the product produced thereby.

DETAILED DESCRIPTION OF THE INVENTION

The present invention is directed to a chocolate flavored hard candy confectionery product containing air jet-milled cocoa. It is amorphous, glassy and non-crystalline. These terms are synonymous, and are thus interchangeable. As used herein, the term "amorphous" refers to the "glassy" or "non-crystalline" state of the hard candy.

The hard candy product of the present invention may be on a stick, such as a lollipop or may be in the form of a drop which, when placed into the mouth, dissolves by sucking.

One of the ingredients of the present chocolate flavored hard candy is air-jet milled cocoa powder. The cocoa powder that is air-jet milled is commercially available cocoa powder or that which can be prepared from cocoa presscakes using standard techniques known in the confectionery arts.

The inventors have found that in the preparation of a chocolate flavored hard candy, it is critical that the cocoa powder utilized have the proper geometry, i.e., size and especially shape. More specifically, the cocoa powder particles to be used require an average particle size of less than about 15 microns in diameter and more preferably less than about 10 microns in diameter and most preferably less than about 5 microns in diameter. However, most importantly, the average particle does not have jagged, sharp or uneven edges; rather the edges thereof are generally rounded. Preferably, the particles are generally elliptical or spherical in shape. By generally rounded edges, it is meant that the edges of the cocoa powder particles are relatively less jagged, less sharp and more even, especially when compared to particles in roll refined cocoa powder and commercial cocoa powder.

The milled cocoa powder utilized in the present invention is prepared by using an air-jet mill. Commercial air jet mills were known heretofore to produce smaller particles. However, it was surprising to find that, in addition to producing small particle size, certain air-jet mills, in relation to cocoa powder, produce particles having generally rounded edges. The inventors have found that only those air-jet mills that reduce the particle size of the cocoa powder to an average grain size of less than about 15 microns in diameter and excise off the jagged and sharp edges and smooth off the edges of the cocoa powder to produce generally non-jagged, and generally rounded edges (as determined by standard techniques in the art, such as by utilizing a Malvern laser light scattering instrument and scanning electron microscope, respectively) can be utilized.

Useful air-jet-mills are described in U.S. Pat. No. 4,807,815, to Csillag, et al., U.S. Pat. No. 4,189,102 to Andrews, U.S. Pat. No. 3,559,895 to Fay, U.S. Pat. No. 4,056,233 to Fay, U.S. Pat. No. 4,504,017 to Andrews and U.S. Pat. No. 3,726,484 to Schurr, the contents of all of which are incorporated by reference.

In one example, described in U.S. Pat. No. 3,559,895, the air-jet mill consists of a generally circular grinding chamber, grinding jets containing pressurized air that feed from the supply of said air into the grinding chamber through a plurality of circumferentially spaced jet orifices to establish in the grinding chamber a high velocity inwardly spiralling vortex of air, feeder jets that inject the material to be pulverized (in this instance, cocoa powder) into the chamber through a plurality of circumferentially spaced jet orifices which are in communication with said supply and the interior of said chamber for entrainment of the cocoa powder particles in the vortex. The movement of the cocoa powder particles in the vortex is faster than the speed of movement of these particles radially inward towards a discharge outlet at the center of the vortex. The grinding jet orifices are equal in number to the number of feeder jet orifices, and each feeder jet orifice is located downstream of a corresponding grinding jet orifice in close proximity thereto. In addition, the angle of injection of each grinding jet into the grinding chamber is such that its bore extends at an acute angle, e.g., 60°, of the direction of the initial discharge of the cocoa powder from its closely related feed jet such that there is no impingement of these paired jets, one against the other and such that there is minimized any tendency for the heavier and coarser particles to be pulverized from being prematurely carried by the inwardly directed force component of the vortex towards the discharge outlet of the apparatus. In addition, the angle is such that it helps to create and maintain the vortex of pressurized air. Thus, utilizing this apparatus, the heavier and coarser particles of the cocoa powder remain in the outer vortex until they have been reduced in size. In other words, each of a plurality of grinding jets uniformly spaced about the peripheral wall of the grinding chamber is employed to conjointly establish therein a high velocity inwardly spirally vortex of the pressurized air which operates to initially confine the feed cocoa powder jetted into the grinding chamber to a path of travel closely adjoining the surrounding wall of the chamber from whence it is carried by the spiralling vortex to its center for ultimate discharge from the grinding chamber. Thus, cocoa powder particles whirled about in the spiralling vortex at high speed are reduced or ground to the desired smaller particle size through attrition caused by the colliding and rubbing together and by their abrading contact with the internal wall surfaces of the vortex chamber. Moreover, this attrition simultaneously cuts off the jagged edges from the cocoa powder particles, producing particles and agglomerates generally having significantly less jagged and much smoother edges. The finely reduced cocoa powder particles are carried by the vortex toward its center for discharge from the air-jet mill either byway of the top discharge outlet together with the spent gas exhausting from the grinding chamber or under the influence of gravity into a collector extending from the bottom of the mill. The relative arrangement of the feed and grinding jets not only maintains a high velocity vortical travel of the raw material in the grinding chamber, but even more importantly, maintains the heavier and coarser particles in the outer regions of the vortex until such time as they are sufficiently reduced in size to be carried out through the vortex discharge outlet with the spent air. Thus, size reduction and excision of the rough particle edges are accomplished solely by the velocity of the air from the grinding jets and centrifugal force which maintains the coarser particles in the outer region of the vortex until they have been so reduced in size by attrition as to enable them to be carried out by the flow of air inwardly of the vortex and out of the discharge outlet with the spent air. The air is introduced into the grinding chamber at temperatures and pressures usually utilized in air-jet mills, e.g., preferably from 100 to 150 psi, while the cocoa powder is fed into the grinding chamber under relatively slight pressure (preferably from 5 to 8 psi) by an injector-type feeder mechanism. The grinding chamber pressure preferably varies between about 3 and 20 psi.

The spiralling effect of the vortex may be enhanced by directing one or more, preferably alternate jets, at a skew angle to the whirling vortex, for example, angled to a point other than the center of the vortex stream, such as partly toward the outer portion of the stream, while maintaining the same advancing angle of the jet. In this manner, a certain twisting motion can be induced, increasing admixture of the particles. Alternatively, alternate jets can be skewed towards the interior and exterior of the stream.

In a variation thereof, as described in U.S. Pat. No. 4,056,233, the grinding chamber is internally provided with a baffle located in the center of the vortex about which the heavier and coarser particles are whirled at high velocity back into the vortex by the centrifugal force thereof for such further attrition of the particles prior to their discharge from the grinding chamber until they have been significantly reduced in size. The central baffle which may be of solid or tubular form extends upwardly from the bottom of the grinding chamber to a level just short of the chamber ceiling. The barrier is so located relative to the discharge outlet of the air-jet mill and is of such circular construction coaxial with such outlet as to provide within the internal grinding chamber an inner annular region in which the heavier and coarser particles which may have radially traversed the spiralling vortex of the air are restrained by gravity until they have been rendered light enough in weight through attrition so as to enable them to be lifted by the spiralling vortical stream out of the vortex and thence into the discharge outlet for disposal. They may be disposed by either top or bottom discharge or both from the grinding chamber. The refined mass enters the discharge outlet by way of passageways located just above the top of the barrier in the grinding chamber. Again, in this example, the air-jet mill excises the jagged edges of the cocoa powder to produce smaller particles and agglomerates having generally rounder contours.

Another type of air-jet mill is a fluid-bed air-jet mill, wherein the frequency of collision of particles and thus the efficiency of grinding is increased by the use of fewer nozzles of larger diameter, when compared to the above apparatus, and which are operated opposite to each other and are located in the bottom part of a larger container. The nozzles operate to fluidize the entire amount of material in the container with air flow entraining the fewer grains to be passed through a rotating sizer in the top section or in the center of the chamber. Meanwhile, the coarse fraction slips back down the outer perimeter of the chamber through centrifugal forces for repeated grinding.

In another variation, a variable speed mechanical classifier prevents unground material from exiting the grinding chamber while at the same time forcing the oversized particles back into the grinding chamber.

But, again, in these air-jet mills, the cocoa powder particles produced by the air-jet mills have much smoother edges and significantly less jagged edges and have an average size of less than about 15 microns.

Examples of useful commercially available jet pulverizers for producing the air-jet milled cocoa powder utilized in making the chocolate flavored hard candy of the present invention include the TROST™ Air Impact Pulverizer, such as Model T-60, manufactured by Garlock Plastomer Products; the ROTO-JET Model 30 manufactured by Fluid Energy Aljet; Model 24–920 MICRON MASTER® JET PULVERIZER manufactured by the Jet Pulverizer Company; AIR JET PULVERIZER Model CJ 100, manufactured by Nisshin Engineering Co., Ltd., and the like. Air-jet mills, similar to the models described above with different sizes and production rates, are commercially available and are also useful in making the chocolate flavored hard candy of the present invention.

After the cocoa powder was air-jet milled, utilizing, for example, the Micron Master® Jet Pulverizer, the inventors noticed that under a scanning electron microscope, the cocoa powder particles had generally smooth edges. More specifically, the particles were not as jagged or sharp when compared to the particles in commercialized cocoa powder or from roll refined cocoa. It is this difference which accounts for the mouth feel differences between chocolate flavored hard candy using air-jet milled cocoa powder and using commercialized or roll refined cocoa powder.

In addition, it was noted that the particles were agglomerates composed of much smaller individual rounded spheres. Many of these individual sphere-like particles were determined to be under two microns in size. The average size of the aggregates was less than about 15 microns in diameter. They had much less jagged edges than cocoa powder milled by other methods. But, as indicated hereinabove, it is these attributes which account for the satisfactory sensory appeal in the hard candy produced therefrom.

Thus, as used herein, the term "air-jet milled cocoa powder" is meant to encompass individual particles generally having rounded edges which are less than or equal to about 15 microns in diameter or which are comprised of aggregates of cocoa powder particles generally having rounded edges, wherein the size of said aggregates is less than or equal to about 15 microns in diameter.

Another essential ingredient in the hard candy formulation of the present invention is the amorphous candy mass. The amorphous candy mass is comprised of a sweetener. The sweetener is comprised of a carbohydrate or sugar alcohol commonly known in the art or mixture thereof. The sweetener present in the chocolate flavored hard candy confection of the present invention is in an amorphous state. If a crystalline carbohydrate is utilized, it is converted to the amorphous state by techniques known in the art, as described hereinbelow.

The carbohydrates utilized in making the chocolate flavored hard candy of the present invention are those that are normally used in hard candy confections. They can be sugars. Examples include, but are not limited to, sucrose, dextrose, fructose, lactose, maltose, hydrolyzed lactose, invert sugar, corn syrup solids including regular, high fructose and high maltose corn syrup, molasses, honey, maple sugar, brown sugar, fructooligosaccharides, fruit juice concentrates and the like. However, the carbohydrate may be completely or partially substituted with a sugar alcohol. Suitable sugar alcohols include isomalt, sorbitol, hydrogenated starch hydrolysate, maltitol, xylitol, lactitol, mannitol or erythritol or mixtures thereof. Bulking agents, such as polydextrose, may be partially substituted for the carbohydrates or sugar alcohols. In addition, the sugar or sugar alcohol can be partially replaced with high potency sweeteners, such as aspartame, acesulfame-K, saccharin, cyclamates, alitame®, thaumatin, glycyrrhizin, stevioside, neohesperidin dihydrochalcone, sucralose, suosan, miraculin, monellin, synthetic alkoxy aromatics, such as dulcin and P-4000, peptide amino acid based sweeteners, such as derivatives of aspartyl malonate esters, succinanilic acid, gem diaminoalkanes and the like. When the sugar is completely replaced, then the product is sugar-free.

The preferred amorphous candy mass is comprised of carbohydrates. The preferred carbohydrates are the sugars, especially sucrose, and corn syrup. The more preferred carbohydrate is a mixture of sucrose and corn syrup, which are present in the chocolate flavored hard candy of the present invention in ratios and levels typical of the art.

Water is also present in the hard candy composition of the present invention. As described hereinbelow, water is added to the amorphous candy mass to prepare a solution thereof prior to the cooking or heating. Sufficient amount of water is added to the amorphous candy mass before cooking to solubilize the amorphous candy mass, i.e., the carbohydrates and/or the sugar alcohols not in solution.

Oil, although not an essential ingredient, is preferred in the chocolate flavored hard candy confection of the present invention. It is preferred that the oil is either a dairy-based oil or a vegetable oil. The oil, when present, facilitates the mixing of the air-jet milled cocoa powder and the amorphous candy mass by facilitating the dispersion of the air-jet milled cocoa powder. It also adds perceived richness to the final product and improves the texture thereof.

As used herein dairy based oil refers to milkfat, cream, butter fat or other dairy based ingredients, while vegetable oil refers to a fat derived from vegetable sources. Examples include cocoa butter, coconut oil, corn oil, sunflower oil, soybean oil, safflower oil, palm oil, peanut oil, sesame oil, cottonseed oil and the like or fractionated or hydrogenated vegetable oil, such as hydrogenated coconut oil, fractionated palm oil and the like. The preferred oils are cocoa butter and especially anhydrous milkfat.

The chocolate flavored hard candy may also contain additional optional ingredients that are normally used in hard candy confections. They include adjuvants, e.g., flavoring agents, such as natural flavors, artificial flavors (such as vanillin), and the like; salt (e.g., sodium chloride); acidulants, such as citric acid, tartaric acid, malic acid, lactic acid and the like; emulsifiers, such as lecithin, sorbitan monostearate, sorbitan tristearate, polysorbate 60, 65, 80, DATEM®, sucrose partial esters, and the like; coloring agents such as artificial and natural colors (e.g., caramel color) and the like. When the hard candy of the present invention contains oil, then an emulsifier is preferred. Furthermore, acidulants and coloring agents are particularly useful if a fruit or other flavored chocolate hard candy is prepared, such as cherry chocolate flavored hard candy.

The chocolate flavored hard candy of the present invention is prepared in accordance with general techniques that are used to prepare hard candy, except that air-jet-milled cocoa powder is utilized. An exemplary procedure is described hereinbelow.

The air-jet-milled cocoa powder is mixed with the amorphous candy mass after cooking in water. The milled cocoa powder is present in amounts sufficient to impart chocolate flavor to the mixed product. It is preferred that the amorphous candy mass be mixed with the air-jet-milled cocoa powder in a weight ratio greater than about 6:1, respectively, and even more preferred in a weight ratio of about 12:1 to about 26:1, respectively.

As indicated hereinabove, the oil is an optional ingredient. When added, it is present in sufficient amounts to facilitate the mixing of the air-jet milled cocoa powder with the amorphous candy mass. It is preferred that the oil be added to the air-jet milled cocoa powder prior to mixing with the amorphous candy mass. In a preferred embodiment, the weight ratio of the air-jet-milled cocoa powder to the oil ranges from about 1:3 to about 100:1, and more preferably from about 0.67:1 to 1.5:1. Flavorings, such as vanillin, and coloring, if present in the final product, can also be added to the mixture of air-jet milled cocoa powder and amorphous candy mass or can be added to the air-jet milled cocoa powder or the air-jet milled cocoa powder/oil mixture prior to mixing with the amorphous candy mass. If an emulsifier is added, it is added to the mixture of air-jet milled cocoa powder and amorphous candy mass or it can be added to the air-jet milled cocoa powder or to the air-jet milled cocoa powder/oil mixture prior to its mixing with the amorphous candy mass. The emulsifier is present in emulsifying effective amounts. It is preferred that it be present in amounts ranging from 0.001% to about 1% of the final product (w/w) and more preferably from about 0.01% to about 0.1% (w/w).

As indicated hereinabove, the amorphous candy mass comprises the sweetener which sweetener is a carbohydrate or sugar alcohol at levels and ratios generally known in the art, or mixtures thereof, and optionally a high potency sweetener and/or bulking agent. Prior to mixing with jet-milled cocoa powder, the amorphous candy mass is dissolved in sufficient water to solubilize it, e.g., the carbohydrate, sugar alcohol or other constituent thereof not in solution.

After dissolving the amorphous candy mass in water, the solution is processed using methods generally known in the art. For example, the solution is heated (e.g., cooked in a cooker) to sufficiently high temperatures to evaporate most of the water to the desired concentration. The heating is generally effected under atmospheric conditions. It is preferred that the aqueous solution be heated at or close to about boiling temperatures of the solution.

Heating also serves another function. If the solution is heated sufficiently high, then any crystalline sweetener present therein would be converted to an amorphous state.

The sweetener in the final product is in the amorphous state. If the sweetener in the amorphous candy mass solution is in the crystalline state, it is converted to the amorphous state using methods generally known in the art. For example, the aqueous solution is heated under conditions sufficient to convert and maintain the sweetener in the amorphous state. In a preferred embodiment, the solution is heated at sufficiently high temperatures to convert the sweetener to the amorphous state. In an even more preferred embodiment, the aqueous solution is heated at temperatures at or about the boiling temperature (e.g., substantially close to the boiling temperature). In a more preferred embodiment, a crystallization inhibitor of the sweetener is also present in the aqueous solution of the amorphous candy mass. Once the sweetener is present in the amorphous state, the inhibitor maintains the sweetener in the amorphous state by inhibiting crystallization thereof. These inhibitors (or "doctors") are those that are normally used in the art. They themselves may be sweeteners, and include such substances as invert sugar, corn syrup, glucose syrup, bulking agents or body agents, such as polydextrose and the like, hydrogenated starch hydrosylate, sorbitol and the like. Thus, in an embodiment of the present invention, the amorphous candy mass is comprised of said inhibitor and a carbohydrate or sugar alcohol. If present, the inhibitor is present in amounts effective to inhibit crystallization of the sweetener. It is preferred that it be present in amounts ranging from about 10% to about 900% by weight of the amount of sweetener present in the final product. In an even more preferred embodiment of the present invention, the sweetener is comprised of sucrose and corn syrup (an inhibitor). It is preferred that the ratio of sucrose to corn syrup ranges from about 70:30 to about 50:50 and more preferably from about 60:40 to about 55:45.

The air-jet-milled cocoa powder is mixed with the hot anhydrous candy mass at sufficiently high temperatures to maintain the amorphous candy mass at a viscosity to facilitate blending. The amorphous candy mass and the air-jet-milled cocoa powder are mixed together using techniques commonly used in the art, such as a kneading/tempering table. If the hard candy is moulded using the technique of depositing, then a static or dynamic mixer may be utilized in lieu thereof. Before the product has an opportunity to set, it is formed, moulded and/or shaped using techniques known in the art and then cooled by using techniques known in the art such as in a cooling tunnel and the like to produce the glassy and smooth chocolate flavored hard candy. The amount of water in the finished candy is less than about 12% (w/w), more preferably less than about 4% (w/w) and most preferably from 1% to about 3% (w/w).

As used herein, the term "forming" refers to the techniques of moulding, shaping and forming—techniques known to the skilled artisan. Two preferred techniques of moulding include depositing (e.g., placing the finished product in moulds such as metal moulds) or stamping (wherein the shape of the product is stamped out). These are performed using procedures known in the art. If the product is stamped, then it is preferred that if oil be present, the amount of oil in the hard candy confection be kept low, i.e., about less than 5% by weight. On the other hand, if the product is deposited into moulds, then, if present, the amount of oil in the final product is preferably greater than about 3% by weight.

Other techniques known to the skilled artisan that may be utilized for forming the chocolate flavored hard candy product of the present invention from the hot mixture include, but are not limited to, aeration (pulling), lamination, making the hard candy into a honeycomb, filling the hard candy with filler, such as inter alia, caramel, peanut butter, fruit preserves, creme fillings, and the like, inside the chocolate flavored hard candy casing, and the like.

The chocolate-flavored hard candy products produced by the present process are homogeneous, with the air-jet milled cocoa powder particles substantially uniformly distributed throughout. The surface presents a population of regularly spatially distributed cocoa particles which surface is renewed in the same form as layers are consumed. Use of air-jet-milled cocoa powders of the invention impart the characteristic chocolate flavor but without the sandpaper texture; rather the surface seems smooth and appealing.

The types of chocolate flavored hard candy products produced by the present process and utilizing the present formulations are varied. For example, the product may be a stamped or deposited hard candy (e.g., sucker, lollipop etc.). It may be an aerated (pulled) hard candy, a filled hard candy, laminated or honeycomb hard candy.

A fruit-flavored chocolate hard candy (e.g. cherry chocolate hard candy) is prepared in accordance with the procedure described hereinabove except a fruit flavor (e.g., cherry flavor) and acid are added. Fruit juice may also be added. The fruit flavor and/or fruit juice may be added with the air-jet milled cocoa powder or with the anhydrous candy mass or both in the procedure described hereinabove. The acidulant is added at the end of the mixing step and immediately prior to the forming step.

When the chocolate flavored hard candy is prepared using the air-jet milled cocoa powder in accordance with the present invention, the resulting hard candy has not only a smooth surface, but also possesses the organoleptic, textural and visual appeal found in hard candies.

It is to be noted, that, unless specified to the contrary, all percentages and ratios are by weight. In addition, as used herein, the terms "air-jet milled", "air-jet pulverized" and "air-jet micromilled" are used interchangeably. Furthermore, the terms "air-jet milled cocoa powder" and "air-jet milled cocoa" are synonymous and are used interchangeably.

The following examples further illustrate the present invention.

EXAMPLE I

A amorphous candy mass containing 510 grams of sucrose and 410 grams of 42 DE acid converted corn syrup in 160 grams of water is heated in a cooker. When this mixture is cooked to a moisture content of about 2.0%(w/w), 55 grams of air-jet milled cocoa powder, prepared from air-jet milling commercial cocoa powder using a Micron Master® Jet Pulverizer is added to the hot amorphous candy mass on a mixing/tempering table to produce the finished product, which is formed by a hard candy stamping line.

EXAMPLE II

Commercial cocoa powder is air jet milled using a Micron Master® Jet Pulverizer, Model #24-920. 50 grams of the air jet milled cocoa is mixed with 50 grams of anhydrous milkfat, 0.5 grams of vanillin and 0.5 grams of lecithin to produce a chocolate flavor that is added to the hot amorphous candy mass.

The amorphous candy mass containing 420 grams of sucrose and 340 grams of high maltose corn syrup is placed in 140 grams of water. This is then cooked to a boiling temperature to decrease the moisture content to approximately 2.0% (w/w). After the amorphous candy mass achieves the desired moisture content, the chocolate flavor prepared hereinabove is added thereto through a static mixer to produce the finished product which is formed by depositing into metal moulds.

EXAMPLE III

The procedure of Example II is repeated, except that the anhydrous milk fat is replaced with cocoa butter.

EXAMPLE IV

The procedure of Example II is repeated except that 1 gram of cherry fruit flavor is added to the chocolate flavor prior to mixing with the amorphous candy mass. In addition, 0.5 grams of citric acid is added to the chocolate flavor/amorphous candy mass mixture immediately prior to forming, e.g., moulding. The resulting product formed by depositing into metal moulds is a cherry chocolate flavored hard candy.

EXAMPLE V

The procedure of Example II is followed except the amorphous candy mass comprises 760 grams of isomalt and 2 grams of acesulfame-K to produce a sugar-free chocolate flavored hard candy.

The above embodiments and examples are given to illustrate the scope and spirit of the present invention. The embodiments described herein will make apparent to those skilled in the art other embodiments and examples. These other embodiments and examples are within the contemplation of the present invention. Therefore, the present invention should be limited only by the appended claims.

What is claimed is:

1. An amorphous chocolate flavored hard candy confection comprising a chocolate flavoring effective amount of air-jet milled cocoa powder; an amorphous candy mass comprising a sweetener in sweetening effective amounts, said sweetener being a carbohydrate or sugar alcohol or mixture thereof in the amorphous state; less than about 12% water (w/w) and optionally an emulsifying effective amount of an emulsifier and a sufficient amount of a vegetable or dairy-based oil to effect the dispersion of air-jet milled cocoa powder in the anhydrous candy mass, said air-jet milled cocoa powder being comprised of particles having generally rounded edges with average particle size less than about 15 microns in diameter.

2. The confection according to claim 1 wherein the average particle size of the cocoa powder is less than about 10 microns.

3. The confection according to claim 2 wherein the average particle size of the cocoa powder is less than about 5 microns.

4. The confection according to claim 1 wherein a high potency sweetener, or a bulking agent or mixture thereof is additionally present.

5. The confection according to claim 1 wherein the particles of the air-jet milled cocoa powder are generally spherical in shape.

6. The confection according to claim 1 wherein the air-jet milled cocoa powder is comprised of agglomerates of individual rounded spheres which are less than about 2 microns in diameter, the average size of each agglomerate being less than about 15 microns in diameter.

7. The confection according to claim 1 in which the weight ratio of amorphous candy mass to air-jet milled cocoa powder is greater than about 6:1.

8. The confection according to claim 1 in which oil and emulsifier are additionally present, and in which the ratio of air-jet milled cocoa powder to oil ranges from about 1:3 to about 100:1, and the amount of emulsifier present ranges from about 0.001% to 1.0% (w/w).

9. The confection according to claim 1 wherein the sweetener is a mixture of sucrose and corn syrup in a weight ratio ranging from about 70:30 to about 50:50, and wherein the weight ratio of amorphous candy mass to air-jet milled cocoa powder is greater than 6:1, the ratio of air-jet milled cocoa powder to oil ranges from about 1:3 to about 100:1, and water is present in amounts less than 4% by weight.

10. The confection according to claim 9 in which the water is present in amounts ranging from about 1.0% to about 3.0% (w/w).

11. The confection according to claim 9 in which the ratio of sucrose to corn syrup ranges from about 60:40 to about 55:45, the ratio of amorphous candy mass to air-jet milled cocoa powder ranges from about 12:1 to about 26:1, the ratio of air-jet milled cocoa powder to oil ranges from about 0.67:1 to about 1.5:1, and water is present in amounts ranging from about 1.0% to about 3.0% (w/w).

12. The confection according to claim 1 in which the amorphous candy mass is a sugar or sugar substitute.

13. The confection according to claim 12 in which the sugar is sucrose or corn syrup or mixture thereof.

14. The confection according to claim 1 in which oil is anhydrous milkfat or cocoa butter.

15. The confection according to claim 1 in which the oil is anhydrous milkfat or cocoa butter, the sweetener is a mixture of sucrose and corn syrup and the emulsifier is lecithin.

16. The confection according to claim 1 which additionally comprises an edible salt, coloring agent, flavoring agent, acidulant or mixture thereof.

17. The confection according to claim 1 wherein the amorphous candy mass additionally comprises a crystallization inhibitor of the sweetener.

18. The confection according to claim 17 wherein the inhibitor is present in amounts ranging from about 10% to about 900% of the sweetener.

19. A process for preparing a chocolate flavored amorphous hard candy confection comprising
  (a) air-jet milling cocoa powder until the average particle size is less than about 15 microns in diameter and the edges thereof are generally rounded,
  (b) dissolving an amorphous candy mass comprising a sweetener to produce an aqueous solution of the amorphous candy mass,
  (c) heating the aqueous solution of the amorphous candy mass under conditions sufficient to convert and maintain the sweetener in the amorphous state,
  (d) mixing a chocolate flavoring effective amount of the air-jet milled cocoa powder with a sweetening effective amount of the hot aqueous solution of said amorphous candy mass at sufficiently high temperatures to effect the dispersion of the cocoa powder therein,
  (e) forming the product of (d) and
  (f) cooling the product of (e).

20. The process according to claim 19 wherein the cocoa powder is air jet milled in an air-jet mill comprising a generally circular grinding chamber, means for injecting pressurized air into said chamber through a plurality of circumferentially spaced jet orifices in communication with the air supply and the interior of said chamber to establish therein a high velocity inwardly spirally vortex of said pressurized air, and means for injecting the cocoa powder into the grinding chamber through a plurality of circumferentially spaced jet orifices in communication between a source of said cocoa powder and the interior of said chamber for entrainment of said particles of the cocoa powder in said vortex and movement therewith at a vertical speed of travel which is high as compared with the speed of movement of said particles radially inward toward a discharge outlet at the center of said vortex, said fluid jet orifices being equal in number to that of said feed set orifices, with each feed jet orifices located downstream of a single one of said air jet orifices in such close proximity thereto and with its axis so oriented relatively to that of its proximate air jet orifices that the axis of each feed jet at its point of entry into the grinding chamber extends in non-intersecting relation to the axis of its proximate air jet at the point of entry of the latter into the grinding chamber, whereby those heavier and coarser particles of cocoa powder are ground to the desired smaller particle size having generally rounded edges through attrition caused by the colliding and rubbing together of the cocoa powder particles and by their abrading contact with the internal wall surfaces of the vortex chamber.

21. The process according to claim 19 wherein the weight ratio of anhydrous candy mass to air-jet milled cocoa powder is greater than about 6:1, and the amount of water present in the confection is less than about 12% by weight.

22. The process according to claim 21 wherein oil and emulsifier are additionally present and wherein the weight ratio of air-jet milled cocoa powder to oil ranges from about 1:3 to about 100:1 and the emulsifier is present in the confection in amounts ranging from 0.001% to about 1.0% by weight.

23. The process according to claim 21 wherein the amount of water present in the confection is less than 4% by weight.

24. The process according to claim 19 wherein the sweetener is a mixture of sucrose and corn syrup in a weight ratio ranging from about 70:30 to about 50:50, and wherein the weight ratio of amorphous candy mass to air-jet milled cocoa powder is greater than about 6:1, the amount of water present in the confection is less than about 12% by weight, and an oil and emulsifier are additionally present, wherein the ratio of air-jet milled cocoa powder to oil ranges from about 1:3 to about 100:1 and the emulsifier is present in amounts ranging from about 0.001% to about 1% (w/w).

25. The process according to claim 19 wherein the emulsifier and oil are additionally present and wherein the emulsifier and oil are added to the air-jet milled cocoa powder produced in step (a).

26. The process according to claim 24 wherein the weight ratio of sucrose to corn syrup ranges from about 60:40 to about 55:45, the weight ratio of amorphous candy mass to air-jet milled cocoa powder ranges from about 12:1 to about 26:1, the ratio of air-jet milled cocoa powder to oil ranges from about 0.67:1 to about 1.5:1, the amount of water in the confectionery product ranges from about 1.0% to about 3.0% by weight and the amount of emulsifier present ranges from about 0.001% to about 1% by weight.

27. The process according to claim 19 wherein the oil is anhydrous milkfat or cocoa butter, the carbohydrate is a mixture of sucrose and corn syrup and the emulsifier is lecithin.

28. The process according to claim 24 wherein the oil is anhydrous milkfat or cocoa butter, and the emulsifier is lecithin.

29. The process according to claim 19 wherein an optional ingredient selected from the group consisting of flavoring agent, coloring agent and mixtures thereof is added to the air-jet milled cocoa powder produced in step (a).

30. The process according to claim 19 wherein the particles of the air-jet milled cocoa powder have an average size of less than about 10 microns in diameter.

31. The process according to claim 30 wherein the particles of the air-jet milled cocoa powder have an average size of less than about 5 microns in diameter.

32. The process of claim 19 wherein the pulverized cocoa powder is comprised of agglomerates of individual rounded spheres, which are less than about 2 microns in diameter with the average size of each agglomerate being less than about 15 microns.

33. The process according to claim 19 wherein a crystallization inhibitor of the sweetener is present in sweetener crystallization inhibiting amounts and is additionally added to the aqueous solution of the amorphous candy mass formed in step (b).

* * * * *

UNITED STATES PATENT AND TRADEMARK OFFICE
CERTIFICATE OF CORRECTION

PATENT NO. : 5,637,344
DATED : June 10, 1997
INVENTOR(S) : John R. Carpenter, et al.

It is certified that error appears in the above-identified patent and that said Letters Patent is hereby corrected as shown below:

On the Title Page, Section [75], line 4: "Haarrisburg" should read --Harrisburg--

On the Title Page, Section [56], line 13, after

"Aldrich..." insert the following:

--4,768,721  9/1988  Niemi...........241/39--

On the Title Page, Section [56], Column 2, line 12, after "Anderson..." insert the following:

--OTHER PUBLICATIONS

Chocolate Flavored Tootsie Roll Pops--

Column 4, line 23: "byway" should read --by way--

Signed and Sealed this

Sixth Day of October, 1998

Attest:

BRUCE LEHMAN

Attesting Officer

Commissioner of Patents and Trademarks